(12) United States Patent
Ariyoshi et al.

(10) Patent No.: US 7,926,343 B2
(45) Date of Patent: Apr. 19, 2011

(54) FLOW RATE MEASURING DEVICE

(75) Inventors: Yuji Ariyoshi, Chiyoda-ku (JP);
Masahiro Kawai, Chiyoda-ku (JP); Koji Tanimoto, Chiyoda-ku (JP); Hiroyuki Uramachi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 179 days.

(21) Appl. No.: 12/437,885

(22) Filed: May 8, 2009

(65) Prior Publication Data

US 2010/0095761 A1    Apr. 22, 2010

(30) Foreign Application Priority Data

Oct. 22, 2008    (JP) .................................. 2008-272280

(51) Int. Cl.
*G01F 1/68*    (2006.01)
(52) U.S. Cl. ...................................................... 73/202.5
(58) Field of Classification Search .................. None
See application file for complete search history.

(56) References Cited

U.S. PATENT DOCUMENTS

| | | | | |
|---|---|---|---|---|
| 6,148,663 A | * | 11/2000 | Stahl et al. ................. | 73/114.34 |
| 6,422,070 B2 | * | 7/2002 | Reymann et al. .......... | 73/114.34 |
| 6,595,049 B1 | * | 7/2003 | Maginnis et al. ............ | 73/202.5 |
| 6,868,722 B2 | * | 3/2005 | Tanimoto et al. ............ | 73/202.5 |
| 6,871,534 B1 | * | 3/2005 | Hamada et al. ............ | 73/204.22 |
| 2004/0226357 A1 | * | 11/2004 | Tanimoto et al. ............ | 73/202.5 |
| 2007/0068246 A1 | | 3/2007 | Uramachi | |

FOREIGN PATENT DOCUMENTS

| | | |
|---|---|---|
| JP | 01-135318 U | 9/1989 |
| JP | 2000-002572 A | 1/2000 |
| JP | 2006-153694 A | 6/2006 |

* cited by examiner

*Primary Examiner* — Harshad Patel
(74) *Attorney, Agent, or Firm* — Sughrue Mion, PLLC (57) ABSTRACT

In a flow rate measuring device including a bypass channel having at least one bending portion and at least one channel portions, a detecting element is disposed in the bypass channel to detect the flow rate of measurement target fluid, a ratio L/H of a width H of the channel portion in which the detecting element is disposed, and a distance L from the bending portion at the upstream side of the detecting element to the upstream end portion of the detecting portion is set in range from 0 to 0.7, and a ratio D/H of a distance D from the wall surface of the base side of the detecting element to the center of the detecting portion of the surface of the detecting element and the width H of the channel portion is set in the range from 0.22 to 0.33.

2 Claims, 8 Drawing Sheets

$0 \leqq L/H \leqq 0.7$

$0.22 \leqq D/H \leqq 0.33$

Qa: AVERAGE FLOW RATE
$\Delta Q$: Qmax − Qmin
AMPLITUDE RATIO = $\Delta Q/(2Qa)$
AMPLITUDE RATIO > 1 IS PULSATION CONTAINING COUNTER FLOW

*FIG. 7*

$0.22 \leq D/H \leq 0.33$

FIG. 8

FLOW RATE MEASURING DEVICE

BACKGROUND OF THE INVENTION

1. Field of the Invention

The present invention relates to a flow rate measuring device suitable for measuring an intake air amount of an internal combustion engine, for example.

2. Description of the Related Art

According to a flow rate measuring device described in JP-A-2007-93422 (hereinafter referred to as Patent Document 1), a circuit mount portion is formed at the base end side of the flow rate measuring device disposed in a main channel, and a measuring channel is formed at the tip side of the flow rate measuring device. The measuring channel comprises a flow-in port, first, second, third and fourth bending portions, first, second, third, fourth and fifth channels and a flow-out port, and a flow rate detecting element 6 is disposed in the third channel. A part of measurement target fluid flowing through the main channel flows from the flow-in port into the measuring channel, flows along the surface of the flow rate detecting element, flows out from the flow-out port and then joins the measurement target fluid flowing through the main channel. A heater is provided to the flow rate detecting element, and supplied with current from a control circuit to generate heat. The heater is brought into contact with intake air flowing along the surface of the heater and cooled, whereby the flow rate detecting element detects the flow rate of the intake air as a resistance value variation corresponding to the temperature.

In the conventional flow rate measuring device disclosed in the Patent Document 1, the flow rate detecting element is disposed in the third channel between the second bending portion and the third bending portion. At the second bending portion, the flow direction of the measurement target fluid is changed by 90°, and a portion at which turbulence of flow occurs due to exfoliation of flow at the inner corner side and impinge of flow against the outer corner portion exists in the third channel. When the flow rate detecting element is disposed at the portion where the flow turbulence occurs, an output signal is affected by the flow turbulence and thus it is also fluctuated, so that the measuring precision is deteriorated.

Furthermore, in a thermal type flow rate measuring device, when flow is pulsated due to thermal response delay of a flow rate detector and a non-linear output characteristic, there occurs a lean error that the average flow rate detected by the flow rate measuring device is smaller than the true average flow rate occurs.

Furthermore, when pulse flow accompanied by counter flow occurs, the thermal type flow rate measuring device which has no counter flow detecting function detects the pulse flow as forward flow, so that a rich error that the average flow rate detected by the flow rate measuring device is larger than the true average flow rate occurs.

It has been known by persons skilled in the art to use a bypass channel in order to reduce these pulsation detection errors, and a bypass flow channel is adopted in the Patent Document 1 to reduce the pulsation detection error. That is, a pressure pulsation which is delayed with respect to the pressure pulsation at the flow-in port and the flow-out port of the bypass channel occurs in the bypass channel, and thus the average flow rate is increased, so that the lean error can be reduced. Furthermore, the bypass channel is designed to have a flow-channel structure into which the counter flow hardly flows, whereby the rich error can be reduced.

However, the effect of reducing the pulsation detecting error as described above is dependent on the arrangement position of the flow rate detecting element. However, no attention has been hitherto paid to the point in the conventional device, and thus the effect of reducing the pulsation detection error cannot be sufficiently obtained.

SUMMARY OF THE INVENTION

The present invention has been implemented in view of the foregoing problem of the conventional device, and has an object to provide a flow rate measuring device in which the measuring precision can be enhanced by lowering the effect of flow turbulence of measurement target fluid in a bypass channel and a pulsation detection error can be reduced by improving a pulsation characteristic.

In order to attain the above object, in a flow rate measuring device according to the present invention which includes a main body portion extending into a main channel and having a circuit mount portion therein, a bypass channel that is formed at an extension side of the circuit mount portion of the main body portion and through which a part of measurement target fluid flowing through the main channel flows, a flow rate detecting element that is disposed in the bypass channel and has a detecting portion mounted on the surface thereof, and a control circuit that is mounted in the circuit mount portion and drives the flow rate detecting element to process a signal from the flow rate detecting element, the bypass channel has a flow-in port that faces the upstream side of the flow direction of mainstream of the measurement target fluid and is opened along a plane vertical to the flow direction of the mainstream of the main body portion, a flow-out port that is parallel to the flow direction of the mainstream of the main body portion and is opened along a plane vertical direction to the extension direction of the main body portion, and one or more bending portion at the upstream side of the position at which the flow rate detecting element is disposed, the ratio (L/H) of a width H of a channel in which the flow rate detecting element is disposed, the width H being set in a direction parallel to the flow rate detecting element, and a distance L of the channel in a direction parallel to the flow direction of the mainstream from the inner corner portion of the bending portion at the upstream side of the flow rate detecting element to the upstream end portion of the detecting portion is set in the range from 0 to 0.7.

Furthermore, in the above flow rate measuring device, the ratio D/H of the width H in the direction parallel to the flow rate detecting element of the channel in which the flow rate detecting element is disposed, and a distance D of the channel in which the flow rate detecting element is disposed, the distance D being set in a direction vertical to the flow direction of the mainstream from side wall surface of the circuit mount portion side to the center of the detecting portion, is set in the range from 0.22 to 0.33.

According to the flow rate measuring device of the present invention, the measurement precision can be enhanced by reducing the effect of the flow turbulence of the measurement target fluid in the bypass channel. Furthermore, the pulsation detection error can be reduced by improving the pulsation characteristic.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Preferred embodiments according to the present invention will be described hereunder with reference to the accompanying drawings. In the figures, the same parts or corresponding parts are represented by the same reference numerals.

First Embodiment

Figure 1:
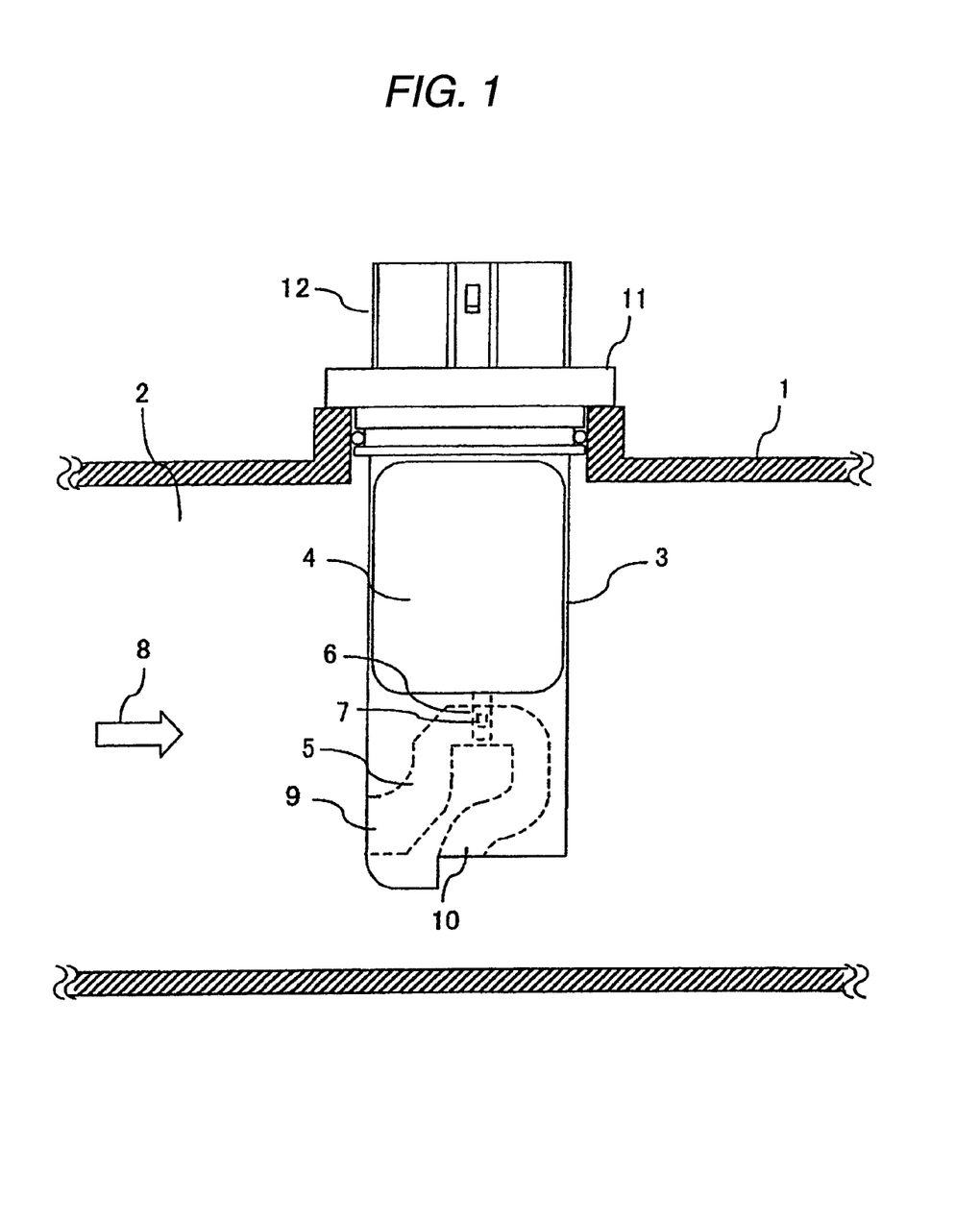
FIG. 1 is a front view showing a state that a flow rate measuring device according to the present invention is secured to a fluid tube of measurement target fluid.

FIG. 1 is a front view showing a state that a flow rate measuring device according to the present invention is secured to a flow tube of measurement target fluid of an internal combustion engine. The main body portion 3 of the flow rate measuring device is inserted into the flow tube 1 and fixed to the flow tube 1 by a flange portion 11. A circuit mount portion 4 and a bypass channel 5 are formed in the main body portion 3 so as to extend along the insertion direction to the flow tube 1. A flow rate detecting element 6 having a detecting portion 7 mounted on the surface thereof is disposed in the bypass channel 5, and a control circuit (not shown) for driving the flow rate detecting element 6 and processing a signal from the flow rate detecting element 6 is mounted in the circuit mount portion 4. A driving power supply of the control circuit and the flow rate signal are connected to the outside through a connector portion 12.

Figure 2:
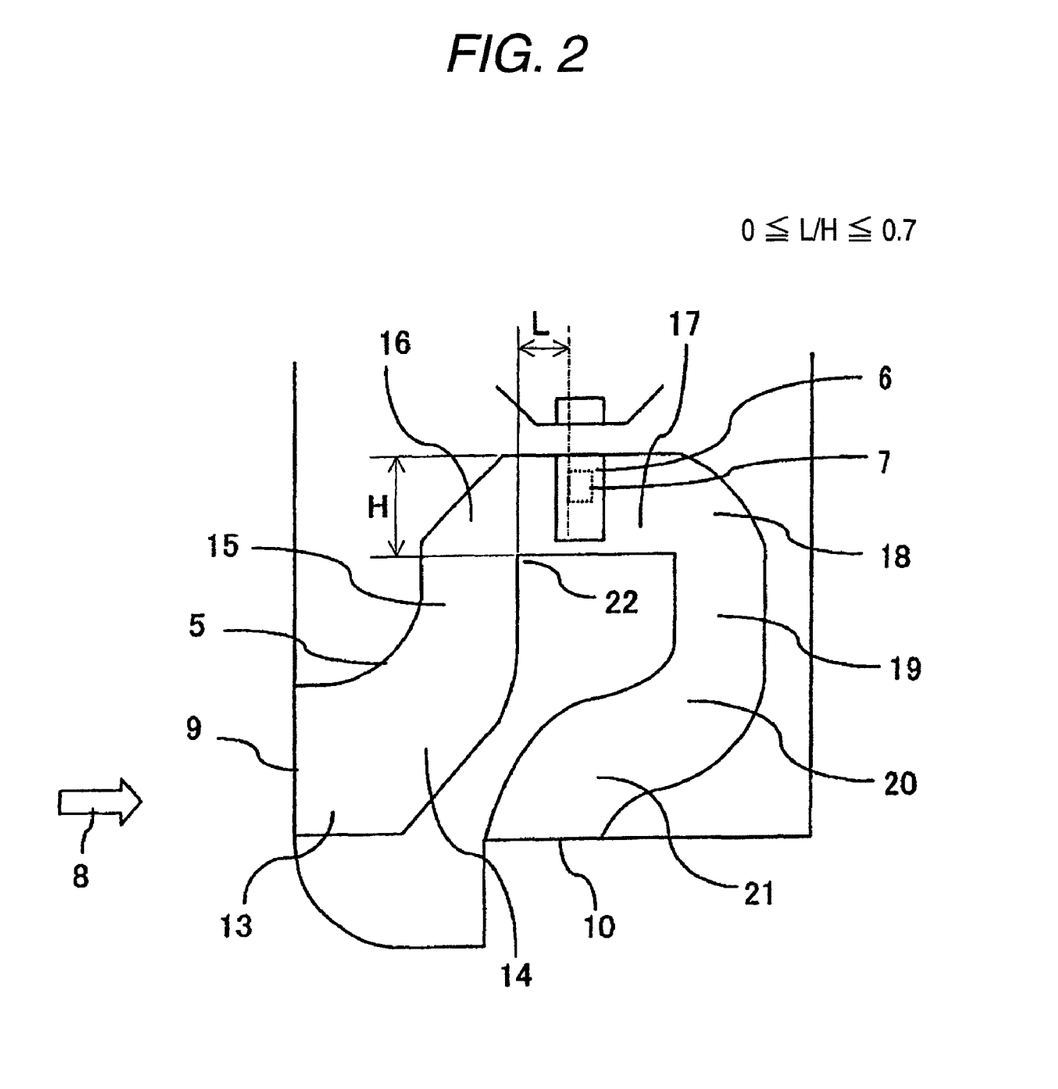
FIG. 2 is a front view showing a main part of the flow rate measuring device according to a first embodiment of the present invention.

FIG. 2 is a front view showing a main part of the flow rate measuring device according to the first embodiment.

The bypass channel 5 has a flow-in port 9 which faces the upstream side of a flow direction 8 of the mainstream of the measurement target fluid flowing in the main channel 2 and is opened along a plane vertical to the flow direction 8 of the mainstream of the main body portion 3, and a flow-out port 10 which is parallel to the flow direction 8 of the mainstream of the main body portion 3 and is opened along a plane vertical to the insertion direction of the main body portion. A first bending portion 14, a second bending portion 16, a third bending portion 18, a fourth bending portion 20, a first channel portion 13, a second channel portion 15, a third channel portion 17, a fourth channel portion 19 and a fifth channel portion 21 are formed between the flow-in port 9 and the flow-out port 10. A part of the measurement target fluid flows from the flow-in port 9 to the bypass channel 5, and the flow rate thereof is detected by the detecting portion 7 of the flow rate detecting element 6 disposed in the third channel portion 17. Thereafter, the part of the measurement target fluid flows out from the flow-out port 10 and joints the mainstream.

Here, in the flow rate measuring device of the first embodiment, in FIG. 2, when H represents the width (in parallel to the flow rate detecting element 6) of the third channel portion 17 in which the flow rate detecting element 6 is disposed and L represents the distance, in parallel to the flow direction 8 of the mainstream, from an inner corner portion 22 of the bending portion at the upstream side of the flow rate detecting element 6 (that is, the second bending portion 16) to the upstream end portion of the detecting portion 7 on the flow rate detecting element 6, the arrangement position of the flow rate detecting element 6 is determined so that the ratio of H and L (L/H) is within the range from 0 to 0.7.

Figure 3:
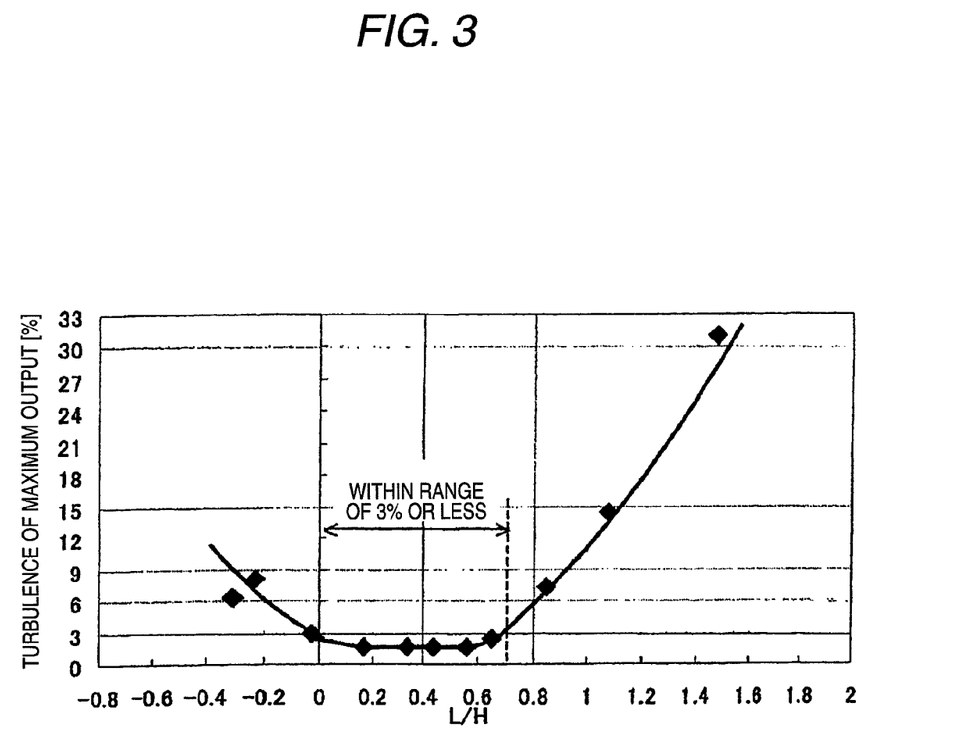
FIG. 3 is a graph showing the relationship between L/H and the maximum output turbulence of the flow rate measuring device to describe an effect of the first embodiment of the present invention.

FIG. 3 shows the relationship between L/H and the maximum output turbulence of the flow rate measuring device. Here, the maximum output turbulence means the maximum value of the overall flow rate range of the output turbulence at each flow amount point calculated according to the following equation (1).

$$\text{Output turbulence [\%]} = \text{standard deviation of output} / \text{average value of output} \times 100 \quad (1)$$

As is apparent from FIG. 3, by setting L/H to the range from 0 to 0.7, the output turbulence can be suppressed to 3% or less. 3% is the precision required to the flow rate measuring device for the internal combustion engine.

As described above, according to the flow rate measuring device according to the first embodiment, the ratio L/H between the width H of the channel portion in which the flow rate detecting element of the bypass channel is disposed and the distance L from the inner corner portion of the bending portion at the upstream side of the flow rate detecting element to the upstream end portion of the detecting portion of the flow rate detecting element is set in the range from 0 to 0.7, thereby obtaining the flow rate measuring device in which the flow turbulence of the measurement target fluid in the bypass channel can be reduced and the measurement precision can be enhanced.

Second Embodiment

Figure 4:
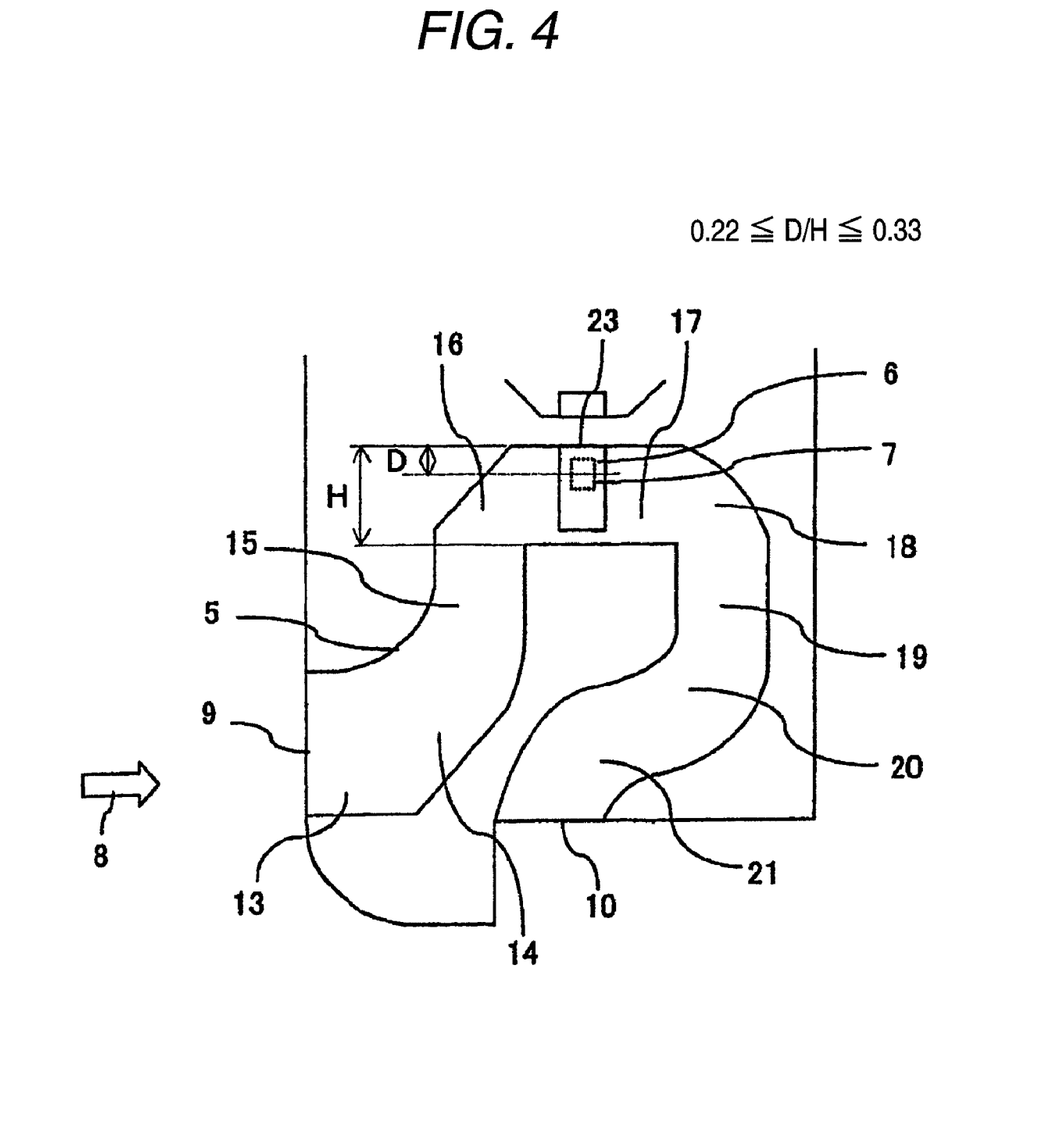
FIG. 4 is a front view showing a main part of a flow rate measuring device according to a second embodiment of the present invention.
Figure 5:
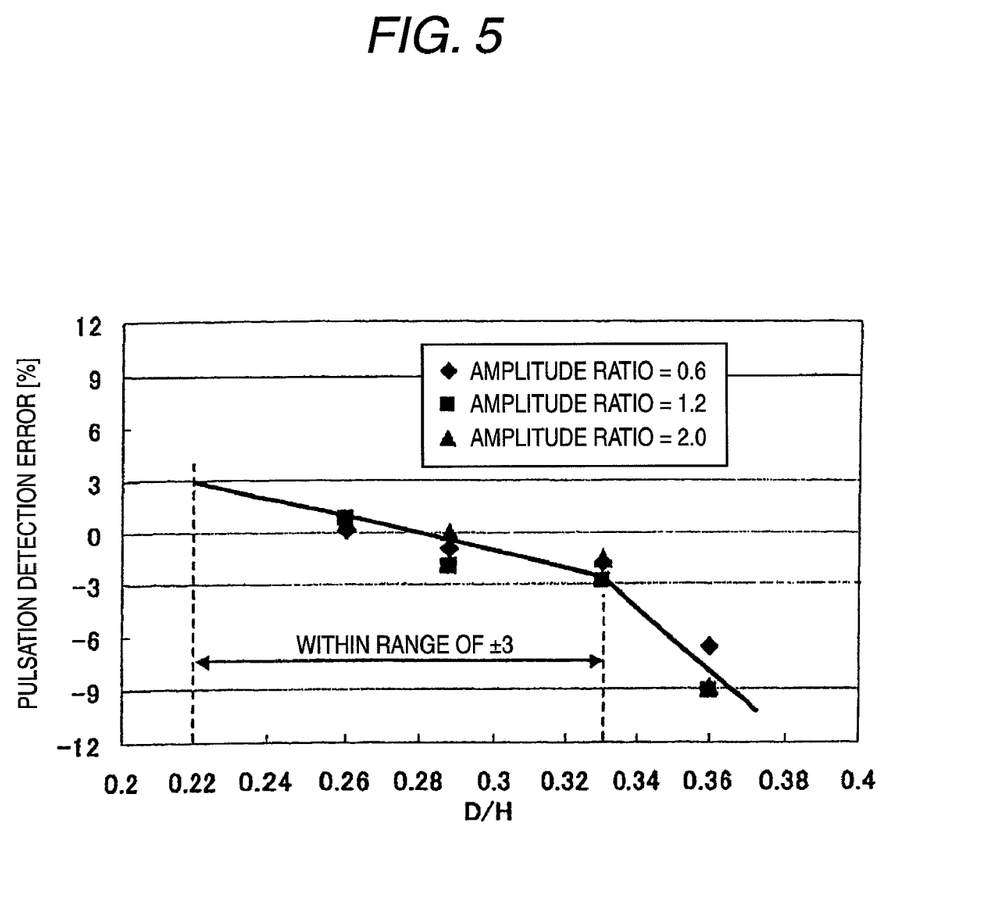
FIG. 5 is a graph showing the relationship between D/H and a pulsation detection error of the flow rate measuring device to describe an effect of the second embodiment of the present invention.
Figure 6:
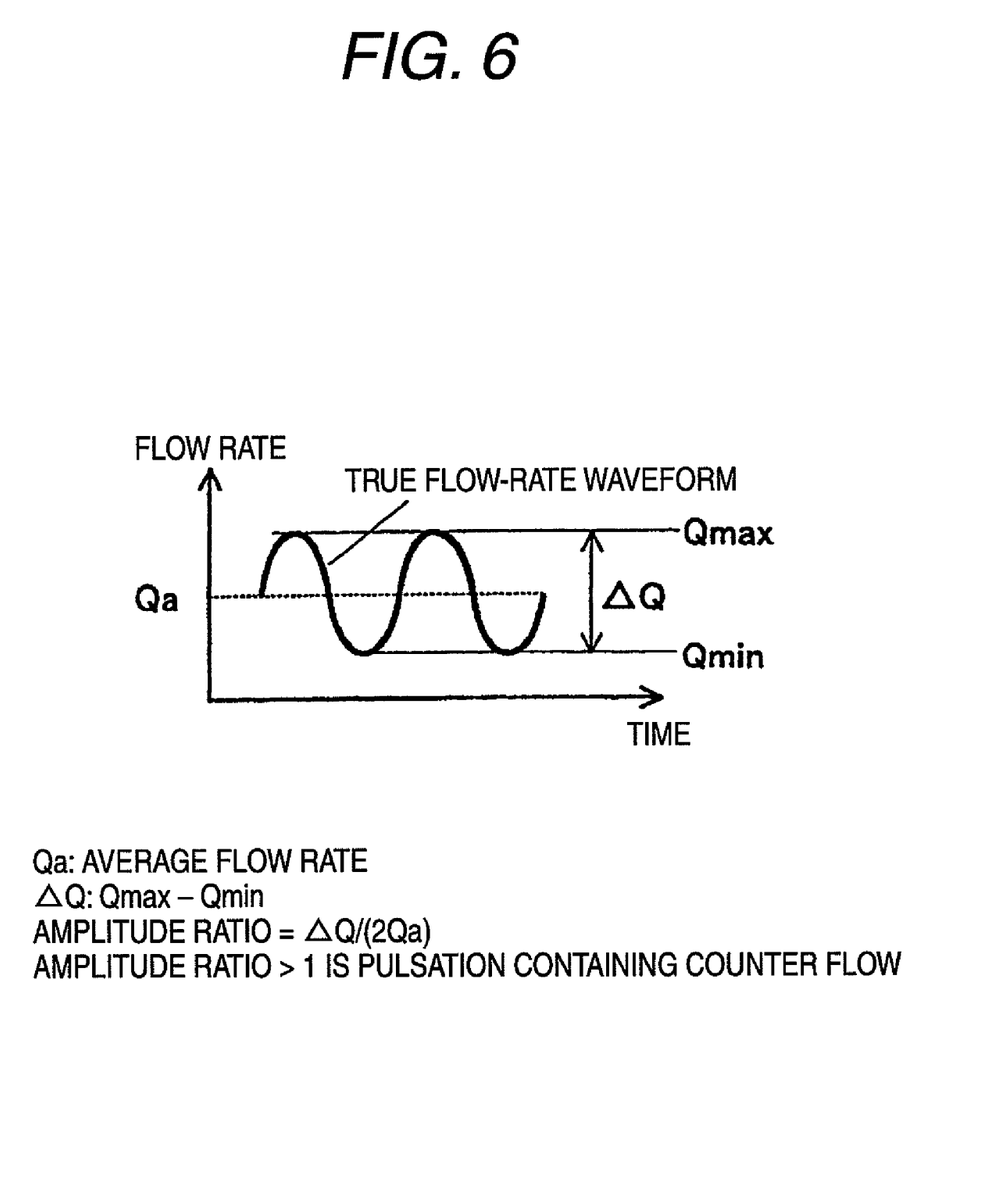
FIG. 6 is a diagram showing an amplitude ratio of the measurement target fluid.

FIGS. 4 to 6 are diagrams showing a flow rate measuring device according to a second embodiment of the present invention. FIG. 4 is a front view showing a main part of the flow rate measuring device, FIG. 5 is a graph showing the relationship between the arrangement position of the flow rate detecting element and a pulsation detection error to described an effect of the second embodiment. FIG. 6 is a diagram showing the amplitude ratio of the measurement target fluid. In the flow rate measuring device according to the second embodiment, as shown in FIG. 4, when H represents the width (in parallel to the flow rate detecting element 6) of the third channel portion 17 in which the flow rate detecting element 6 is disposed and D represents the distance (in a direction vertical to the flow direction 8 of the mainstream) from a side wall surface 23 of the circuit mount portion 4 side of the third channel portion 17 in which the flow rate detecting element 6 is disposed to the center of the detecting portion 7, the arrangement position of the flow rate detecting element 6 is determined so that the ratio of H and D (D/H) is set in the range from 0.22 to 0.33. The other constructions are the same as the first embodiment.

Here, FIG. 5 shows the relationship between D/H and the pulsation detection error of the flow rate measuring device, and the pulsation detection error is calculated according to the following equation (2).

Pulsation detection error (%)=(average value of output/true average flow rate−1)×100 (2)

Furthermore, FIG. 6 shows the amplitude ratio of the measurement target fluid, and the amplitude ratio is calculated according to the following equation (3).

Amplitude ratio=$\Delta Q/2Qa$ (3)

Here, Qa represents the average flow rate, and ΔQ represents Qmax−Qmin. Furthermore, amplitude>1 represents pulsation containing counter flow.

FIG. 5 shows the relationship between D/H and the pulsation detection error of the flow rate measuring device when three types of 0.6, 1.2 and 2.0 are provided as the amplitude ratio of the measurement target fluid. As is apparent from FIG. 5, by setting D/H in the range from 0.22 to 0.33, the pulsation detecting error can be suppressed within ±3% under any amplitude ratio.

As described above, according to the flow rate measuring device of the second embodiment of the present invention, the ratio between the width H of the channel portion of the bypass channel in which the flow rate detecting element is disposed and the distance D from the side wall surface of the circuit mount portion side of the channel in which the flow rate detecting element is disposed to the center of the detecting portion of the flow rate detecting element, that is, D/H is set in the range from 0.22 to 0.33, whereby there can be obtained a flow rate detecting device in which the pulsation detection error can be reduced and the measurement precision can be further enhanced in addition to the enhancement of the measurement precision of the first embodiment.

Third Embodiment

Figure 7:
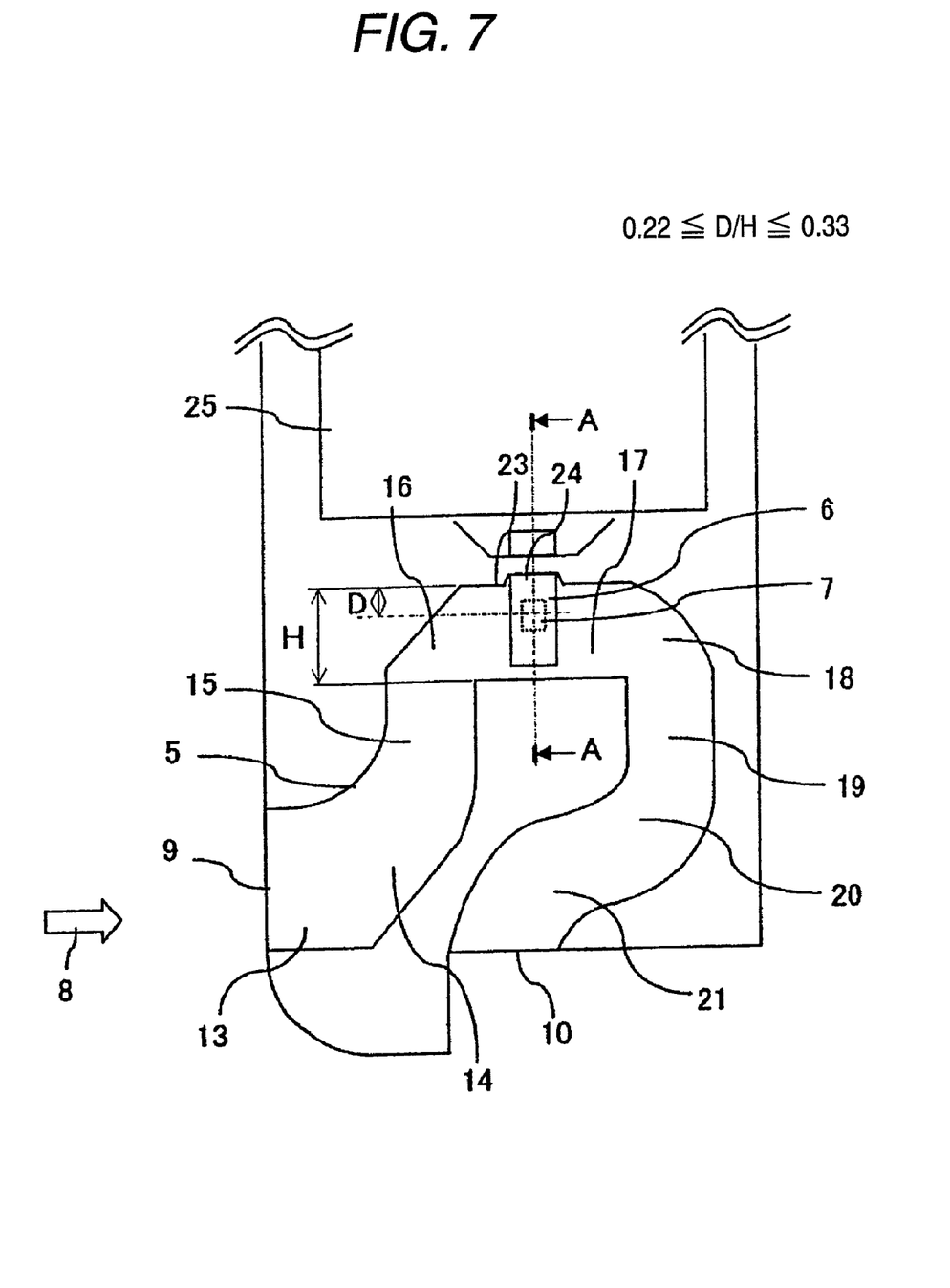
FIG. 7 is a front view showing a main part of a flow rate measuring device according to a third embodiment of the present invention.

FIG. 7 is a front view showing a main part of the flow rate measuring device according to a third embodiment of the present invention. In the flow rate measuring device according to the third embodiment, as shown in FIG. 7, a recess portion 24 extending to the circuit mount portion 4 side is formed at only a portion at which the flow rate detecting element 6 is disposed, on the side wall surface 23 of the circuit mount portion 4 side of the third channel portion 17 in which the flow rate detecting element 6 is disposed. The other constructions are the same as the second embodiment.

Figure 8:
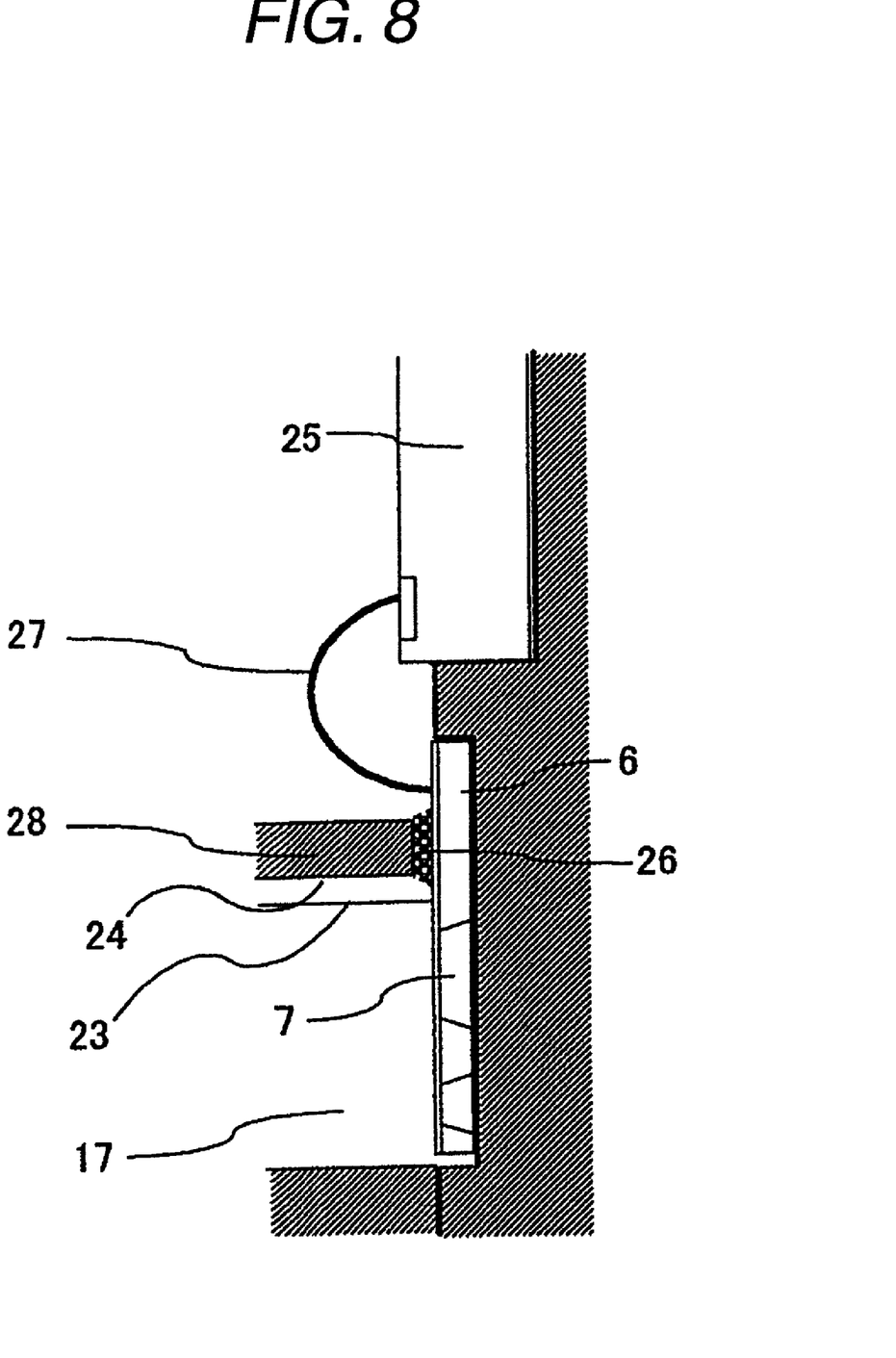
FIG. 8 is a cross-sectional view taken along A-A of FIG. 7.

FIG. 8 is a cross-sectional view taken along A-A of FIG. 7. the flow rate detecting element 6 and a circuit board 25 in the circuit mount portion 4 are electrically connected to each other through a wire 27, and thus the flow rate detecting element 6 is disposed so as to bridge the third channel portion 17 and the circuit mount portion 4. In order to prevent leakage of the measurement target fluid flowing through the third channel portion 17 to the circuit mount portion 4, the third channel portion 17 and the circuit mount portion 4 must be perfectly blocked off by a block-off portion 28 located on the flow rate detecting element 6. Therefore, adhesive agent 26 is filled between the bottom surface of the block-off portion 28 and the surface of the flow rate detecting element 6 so that both the surfaces are adhesively attached to each other.

As described in the second embodiment, when the flow rate detecting element 6 is disposed so that D/H is in the range from 0.22 to 0.33, the end portion at the side wall surface 23 side of the detecting portion 7 may be proximate to the side wall surface 23 in accordance with the size of the detecting portion 7. At this time, when the adhesive agent 26 protrudes to the third channel portion 17 side, the protrusion portion of the adhesive agent 26 adheres to the surface of the detecting portion 7, and may adversely affect the flow rate detection characteristic.

In the third embodiment, the recess portion 24 is formed so as to face the circuit mount portion 4 side at only the portion in which the flow rate detecting element 6 is disposed. Therefore, the adhesion of the adhesive agent 26 to the detecting portion 7 can be prevented and the reliability can be enhanced with maintaining the effect of reducing the pulsation detection error as in the case of the second embodiment.

Various modifications and alterations of this invention will be apparent to those skilled in the art without departing from the scope and spirit of this invention, and it should be understood that this is not limited to the illustrative embodiment set forth herein.

What is claimed is:

1. A flow rate measuring device comprising:
   a main body portion extending into a main channel and having a circuit mount portion therein;
   a bypass channel that is formed at an extension side of the circuit mount portion of the main body portion and through which a part of measurement target fluid flowing through the main channel flows;
   a flow rate detecting element that is disposed in the bypass channel and has a detecting portion mounted on the surface thereof; and
   a control circuit that is mounted in the circuit mount portion and drives the flow rate detecting element to process a signal from the flow rate detecting element,
   wherein the bypass channel has a flow-in port that faces the upstream side of a flow direction of mainstream of the measurement target fluid and is opened along a plane vertical to the flow direction of the mainstream of the main body portion, a flow-out port that is parallel to the flow direction of the mainstream of the main body portion and is opened along a plane vertical direction to the extension direction of the main body portion, and one or more bending portion at the upstream side of the position at which the flow rate detecting element is disposed,
   wherein a ratio (L/H) of a width H of a channel in which the flow rate detecting element is disposed, the width H being set in a direction parallel to the flow rate detecting element, and a distance L of the channel in a direction parallel to the flow direction of the mainstream from the inner corner portion of the bending portion at the upstream side of the flow rate detecting element to the upstream end portion of the detecting portion is set in the range from 0 to 0.7, and
   wherein a ratio D/H of the width H of the channel in which the flow rate detecting element is disposed, the width H being set in a direction parallel to the flow rate detecting element,
   and a distance D of the channel in which the flow rate detecting element is disposed, the distance D being set in a direction vertical to the flow direction of the mainstream from side wall surface of the circuit mount portion side to the center of the detecting portion, is set in the range from 0.22 to 0.33.

2. The flow rate measuring device according to claim 1, wherein a recess portion extending to the circuit mount portion side is formed at only a portion at which the flow rate detecting element is disposed, on the side wall surface of the circuit mount portion side of the channel in which the flow rate detecting element is disposed.

* * * * *